United States Patent
Hicks et al.

[11] Patent Number: 5,953,351
[45] Date of Patent: Sep. 14, 1999

[54] METHOD AND APPARATUS FOR INDICATING UNCORRECTABLE DATA ERRORS

[75] Inventors: Dwain Alan Hicks, Pflugerville; Avery Cox Topps, Austin, both of Tex.

[73] Assignee: International Business Machines Corporation, Armonk, N.Y.

[21] Appl. No.: 08/529,125

[22] Filed: Sep. 15, 1995

[51] Int. Cl.⁶ .................................................. G11C 29/00
[52] U.S. Cl. ................ 371/40.11; 371/37.6; 395/185.01; 395/185.05; 395/185.07
[58] Field of Search .................................. 371/40.1, 40.2, 371/51.1, 37.12, 37.5, 37.6, 37.7, 40.11, 40.12, 40.13, 40.17, 40.3, 42, 47.1; 395/182.04, 185.07, 183.19, 185.01, 185.05, 185.09, 280

[56] References Cited

U.S. PATENT DOCUMENTS

| | | | |
|---|---|---|---|
| 4,072,853 | 2/1978 | Barlow et al. | 371/37.7 |
| 4,371,930 | 2/1983 | Kim | 395/185.07 |
| 4,375,664 | 3/1983 | Kim | 395/185.05 |
| 4,458,349 | 7/1984 | Aichelmann, Jr. et al. | 395/182.04 |
| 4,466,099 | 8/1984 | Meltzer | 371/47.1 |
| 4,761,783 | 8/1988 | Christensen et al. | 371/40.11 |
| 4,780,809 | 10/1988 | Woffinden et al. | 395/185.01 |
| 4,827,478 | 5/1989 | Chan | 371/40.11 |
| 4,852,100 | 7/1989 | Christensen et al. | 371/40.11 |
| 5,111,464 | 5/1992 | Farmwald et al. | 371/40.3 |
| 5,146,461 | 9/1992 | Duschatko et al. | 371/40.17 |
| 5,173,905 | 12/1992 | Parkinson et al. | 371/40.13 |
| 5,361,267 | 11/1994 | Godiwala et al. | 371/37.4 |
| 5,631,915 | 5/1997 | Meaney et al. | 371/40.11 |

*Primary Examiner*—Emmanuel L. Moise
*Attorney, Agent, or Firm*—Kelly K. Kordzik; Winstead Sechrest & Minick P.C.; Anthony V. S. England

[57] ABSTRACT

A method and apparatus for identifying data that contains an uncorrectable error may be accomplished in a computer that includes a memory unit operably coupled to a processor. The memory unit includes an error detection circuit that, when an uncorrectable storage error is detected, produces transmit check bits indicating that the data being transmitted includes an uncorrectable storage error. The processor, which includes a check bit decoder, upon receiving the transmit check bits, interprets the transmit check bits to identify the uncorrectable error. When the uncorrectable error is identified, the check bit decoder provides a data error signal to a processing core of the processor, thereby interrupting the processing core which avoids a system error and the need to reboot the computer.

21 Claims, 8 Drawing Sheets

METHOD AND APPARATUS FOR INDICATING UNCORRECTABLE DATA ERRORS

TECHNICAL FIELD OF THE INVENTION

This invention relates generally to computer architecture and more particularly to identification of uncorrectable errors in data being presented to a processing unit.

BACKGROUND OF THE INVENTION

As is known, the basic architecture of a computer includes a central processing unit, memory units, and buses that interface the memory units with the central processing unit. The memory units, which may be read-only memory (ROM) or random access memory (RAM), store programs, or algorithms, to be executed by the central processing unit (CPU). The memory units also store data, which is being operated upon by the CPU, and intermediate data, which is in the process of being operated on by the CPU.

The simplified description of a computer architecture presented above is common in any type of computer. For example, a personal computer, a workstation, or a main frame system, each include the above-described basic elements. In any of these computers, data stored in the RAMs, which may be dynamic RAMs (DRAM), may occasionally encounter a storage error. Storage errors within a DRAM are a somewhat natural occurrence in memory units due to the DRAM design. To overcome such storage errors, most memory units that have a DRAM architecture include an error correction circuit. The error correction circuit utilizes stored check bits and, when data is to be read from the memory unit, calculates new check bits based on the data being read and compares the new check bits with the stored check bits. When the stored check bits match the newly calculated check bits, the data is storage error free. If, however, the newly calculated check bits do not match the stored check bits, a storage error exists.

Depending on the severity of the storage error, it may or may not be correctable. The ability to correct a storage error depends on the error correction circuitry within the memory unit. For example, a circuit that includes a seven-bit error correction code (ECC) may detect two errors and correct one. If the number of bits used in the ECC is increased, the number of corrections may also be increased. Thus, using the seven-bit ECC, if more than one storage error is detected, at the bit level, the data includes an uncorrectable storage error.

When data, which includes an uncorrectable storage error, is transmitted to the CPU, the CPU attempts to utilize such data. When the CPU utilizes the data, a system error occurs which, in many cases, requires the computer system to be rebooted. Granted, the occurrence of uncorrectable storage errors happens very infrequently, in the range of once a month to once a year, but is still too often in many computer systems. For example, in heavy user systems, such as workstations, minicomputers, or mainframes, the rebooting process may take up to 24 hours. This, in many applications, is an unacceptable delay.

In addition to storage errors, the computer system described above is susceptible to transmission errors. As mentioned, the memory is coupled to the CPU via data buses. Occasionally, the data transmitted between the memory and the CPU is corrupted, thereby producing transmission errors. The CPU includes transmission error detection circuitry to identify such errors. Depending on the severity of the transmission error, the data may be corrupted beyond repair such that if the CPU utilizes the data, a system error will occur.

Therefore, a need exists for a method and apparatus that detects when an uncorrectable error is being presented to the CPU such that the CPU may appropriately handle the data to avoid system errors.

BRIEF DESCRIPTION OF THE DRAWINGS

FIG. 2 (FIG. 2A and FIG. 2B) illustrates a more detailed schematic block diagram of the computer architecture which incorporates the present invention;

FIG. 3 (FIG. 3A and FIG. 3B) illustrates a logic diagram which may be used to implement the present invention;

DETAILED DESCRIPTION OF THE DRAWINGS

Generally, the present invention provides a method and apparatus for identifying data that contains an uncorrectable error. This may be accomplished in a computer that includes a memory unit operably coupled to a processor. The memory unit includes an error detection circuit that, when an uncorrectable storage error is detected, produces transmit check bits indicating that the data being transmitted includes an uncorrectable storage error. The processor, which includes a check bit decoder, upon receiving the transmit check bits, interprets the transmit check bits to identify the uncorrectable error. When the uncorrectable error is identified, the check bit decoder provides a data error signal to a processing core of the processor, thereby interrupting the processing core from processing this data. With such a method and apparatus, the present invention provides a mechanism for alerting the processing unit of incoming data that includes uncorrectable errors. By alerting the processing unit, the processing unit can be interrupted, or disabled, such that it does not process the corrupted data, avoiding system errors and a lengthy rebooting process.

Figure 1:
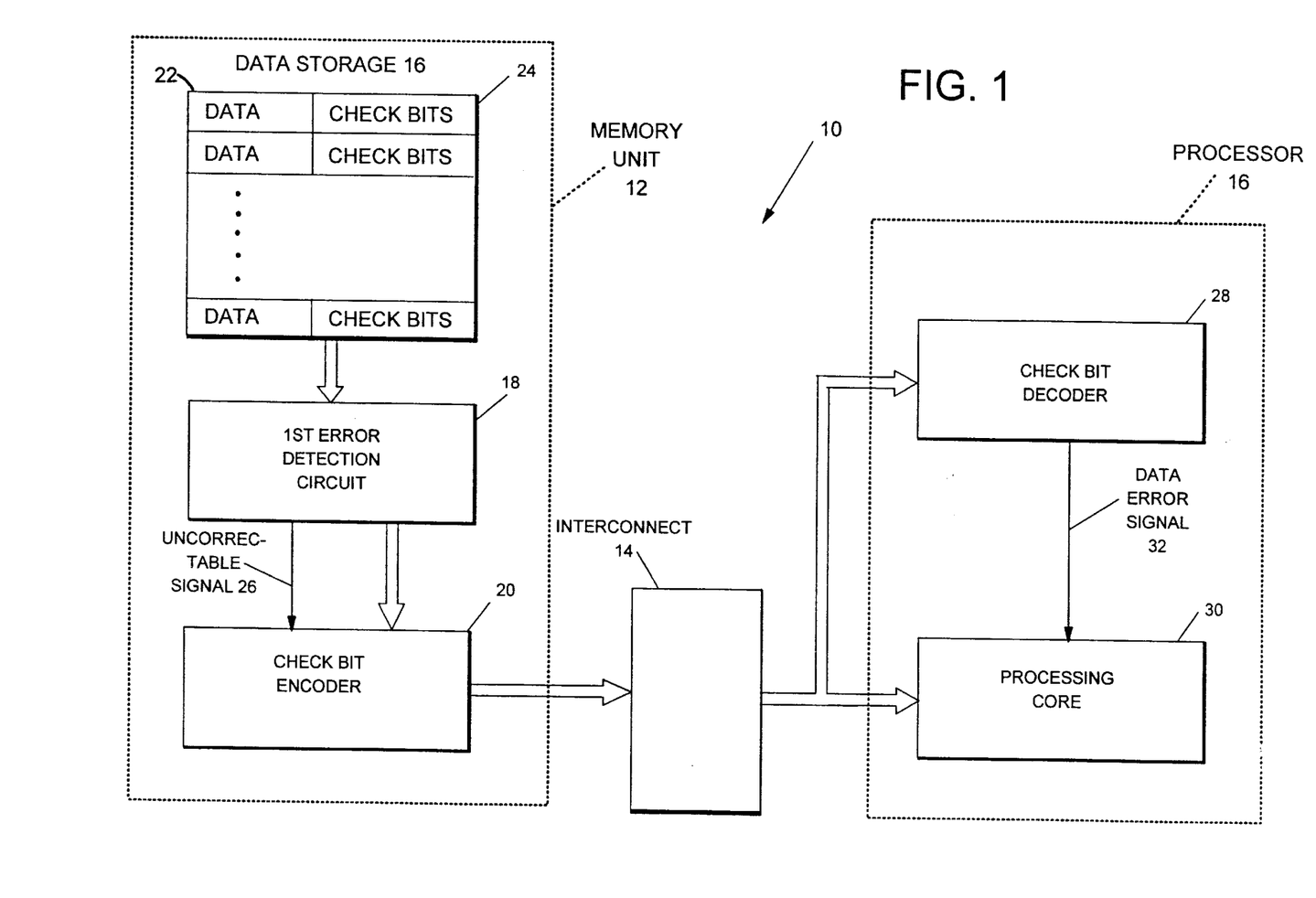
FIG. 1 illustrates a schematic block diagram of a computer architecture incorporating the present invention.

FIG. 1 illustrates a schematic block diagram of a basic computer, or data processing system, 10. The computer 10 includes a memory unit 12 operably coupled to a processor 16 via an interconnect 14. The interconnect 14 may be a data bus, address bus, input/output port, or a combination thereof. The memory unit 12 includes a data storage area 16 that is operably coupled to an error detection circuit 18 which is connected to a check bit encoder 20. The data storage 16 is broken down into a plurality of data blocks wherein each data block includes data 22 and storage check bits 24. Note that the processor may be a microprocessor, microcontroller, digital signal processor, or any processing device utilized within a central processing unit.

Upon receiving an address, the memory unit interprets the address to identify a particular data block. Having identified the data block, the data 22 and stored check bits 24 are provided to the error detection circuit 18. The error detection circuit 18 may perform a variety of error correction coding processes to determine whether the stored data 22 has any errors. For example, the error correction coding that the error detection circuit may use includes a seven-bit error correction coding in which the data is broken into seven segments wherein each segment has a corresponding parity value. The corresponding parity values are combined to form new check bits which are compared with the stored check bits. If the stored check bits match the new check bits, the error detection circuit 18 indicates that there are no storage errors. If, however, the new check bits do not match the stored check bits, an error has been detected. Having detected an error, the error detection circuit 18 determines whether the error is a correctable or uncorrectable one. This determination is based on the bit size of the error correction coding. For example, a seven-bit error correction coding scheme can detect two errors and correct one. By using more bits, more detections and corrections may be obtained. Thus, in the seven-bit error correction coding scheme, a correctable error is one that has one bit, or entry, which can be corrected. An uncorrectable error is one that has two or more bits that have a storage error.

Having identified the error, the error detection circuit provides an uncorrectable error signal 26 to the check bit encoder. In addition, the data is passed from the error detection circuit 18 to the check bit encoder. The uncorrectable error signal may be transmit check bits generated by the error detection circuit wherein the check bits identify an entry not within the data block. For example, if the data block contains 32 bits, the transmit check bits identifying an uncorrectable error would point to the 34th bit. As one skilled in the art will readily appreciate, the transmit check bits indicating the uncorrectable error may point to any entry not within the data block. The check bit encoder 20, upon receipt of the transmit check bit and the data, encodes the data using a second error correction coding scheme. The second error correction coding scheme is a simpler error correction scheme than the first version. A simpler scheme is generally used because computers are less likely to encounter a transmission error than it is to encounter a storage error, thus less protection is needed.

The preceding discussion has focused on when an uncorrectable storage error has been detected. The memory unit also processes the data when no errors or a correctable error have been detected. When no errors have been detected, i.e., the calculated check bits match the stored check bits, the data is passed through the error detection circuit 18 through the check bit encoder 20 and routed subsequently to the processor 16. When a correctable error has been detected, the uncorrected data is routed to the processor 16 along with transmit check bits that identify the correctable error. Recall that, for a seven bit ECC, a correctable error is one that has a single bit in error.

When the processor receives the data and transmit check bits, the processor, via the check bit decoder 28, interprets the transmit check bits. To verify the integrity of the data being received, the check bit decoder 28 generates receive check bits from the data received and compares the received check bit with the transmit check bits. When the received check bits match the transmit check bits, the check bit encoder indicates that the data being received contains no errors. If, however, the received check bits do not match the transmit check bits, the check bit encoder determines whether the transmit check bits indicate an uncorrectable storage error. When the transmit check bits indicate the uncorrectable storage error, the check bit decoder 28 generates a data error signal 32 which is supplied to the processing core 30. If, however, the transmit check bits indicate a correctable error, the check bit decoder 28 will correct the error and provide the corrected data to the processing core.

In the event that the data error signal 32 is activated, i.e., an uncorrectable error has been identified, the processing core 30 will be interrupted such that it will not process the data containing the uncorrectable error. By not processing data that includes an uncorrectable error, the computer system employing the present invention avoids a system error. By avoiding a system error, the computer avoids a lengthy reboot process. In large computer system applications, the rebooting process may take up to 24 hours. Thus, substantial time and business losses may be averted by the use of the present invention.

Figures 2, 2B:
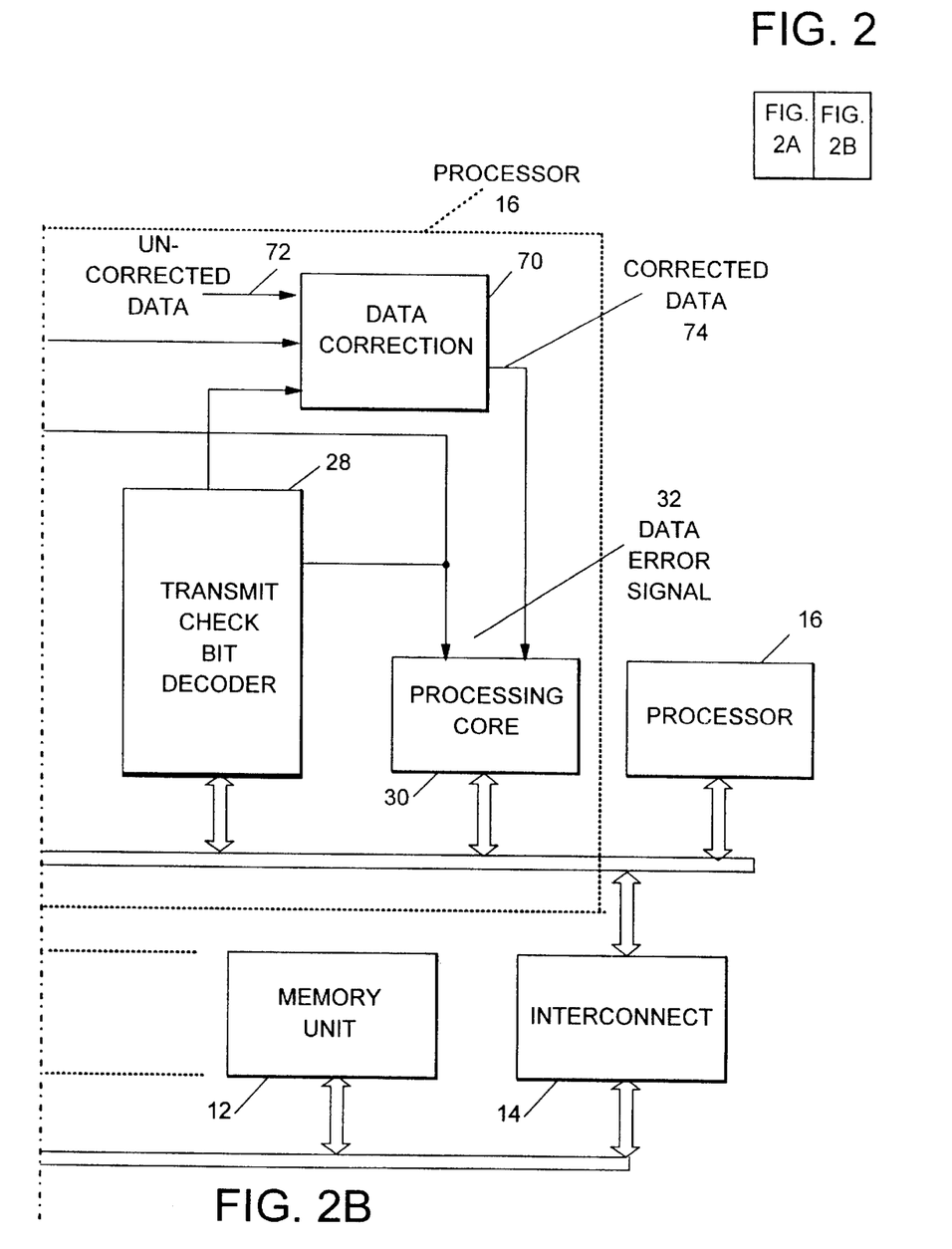

FIG. 2 (FIG. 2A and 2B) illustrates a computer architecture 50 that includes a plurality of memory units 12 operably coupled through an interconnect 14 to a plurality of processors 16. Each of the memory units 12 may be configured as the memory units of FIG. 1 or may include a storage check bit encoder 54, a plurality of data storage elements 16, a storage error detection circuit 18, and a check bit encoder 20. The storage check bit encoder, upon receiving data 52, performs an error detection process to insure that the data being received is properly stored and can be properly retrieved. In essence, the storage check bit encoder receives the data, generates check bits from the data, and compares it with check bits being received. If the check bits match, the storage check bit encoder allows the data and the check bits to be stored in one of the data storage elements 16.

Figure 2A:
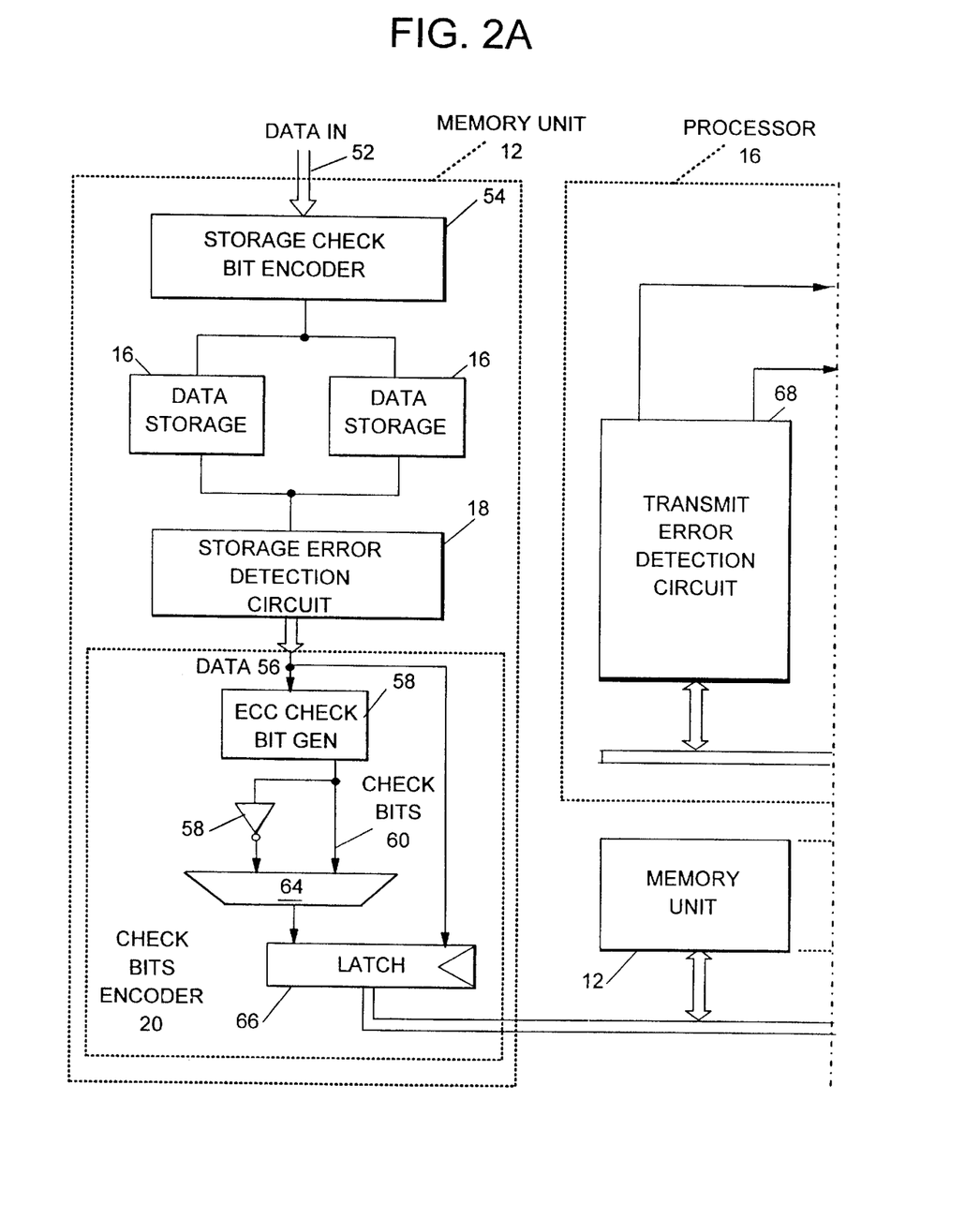

The check bit encoder 20 includes an error correction coding (ECC) check bit generator 58 which produces transmit check bits 60. The transmit check bits 60 are coupled to an invertor 58 and inverted to produce inverted transmit check bits 62. The transmit check bits 60 and the inverted transmit check bits 62 are provided to multiplexor 64. When the storage error detection circuit 18 provides an uncorrectable error signal to the multiplexor 64, the inverted transmit check bits 62 are provided to latch 66. If, however, the storage error detection circuit indicates a correctable error, or no error, the multiplexor 64 provides the transmit check bits 60 to the latch 66. In addition, the latch 66 receives data 56. At the next clock cycle, the latch provides the transmit check bits 60 and the data 56, or the inverted transmit check bits 62 and the data 56, to the processors 16 via the interface 14.

Upon receipt of the data 56 and the transmit check bits 60 or the inverted transmit check bits 62, the processor performs a transmit check bit decode, as described above with reference to FIG. 1. In addition, the processor 16 performs a transmission error detection via the transmit error detection circuit 68. The transmit error detection circuit 68 determines whether, via the transmission path, an error has occurred. When an error has occurred, the transmission error detection circuit 68 determines whether it is a correctable or uncorrectable error. When it is correctable, the transmit error detection circuit 68 indicates the error and its location. If, however, the error is uncorrectable, the transmit error detection circuit provides an uncorrectable error signal, or the data error signal 32, to the processing core.

As shown, the processor 16 further includes a data correction circuit 70. The data correction circuit 70 receives signals from the transmit error detection circuit 68 and the transmit check bit decoder 28. When either the transmit error detection circuit 68 or the transmit check bit decoder 28 indicate a correctable error, the data correction circuit 70 corrects the uncorrected data 72 to produce corrected data 74. The correction process employed by the data correction circuit depends on the error correction coding scheme being used. Thus, in the seven-bit error correction coding scheme described above, the data correction circuit would identify, based on the transmit check bits, which bit, or entry, of the data block contains the error, and upon identifying that particular entry, inverts the data of the entry, thereby correcting the data.

As described above, when the data error signal 32 is activated, the processing core is interrupted such that it does not process data that includes an uncorrectable error.

Figures 3, 3A:
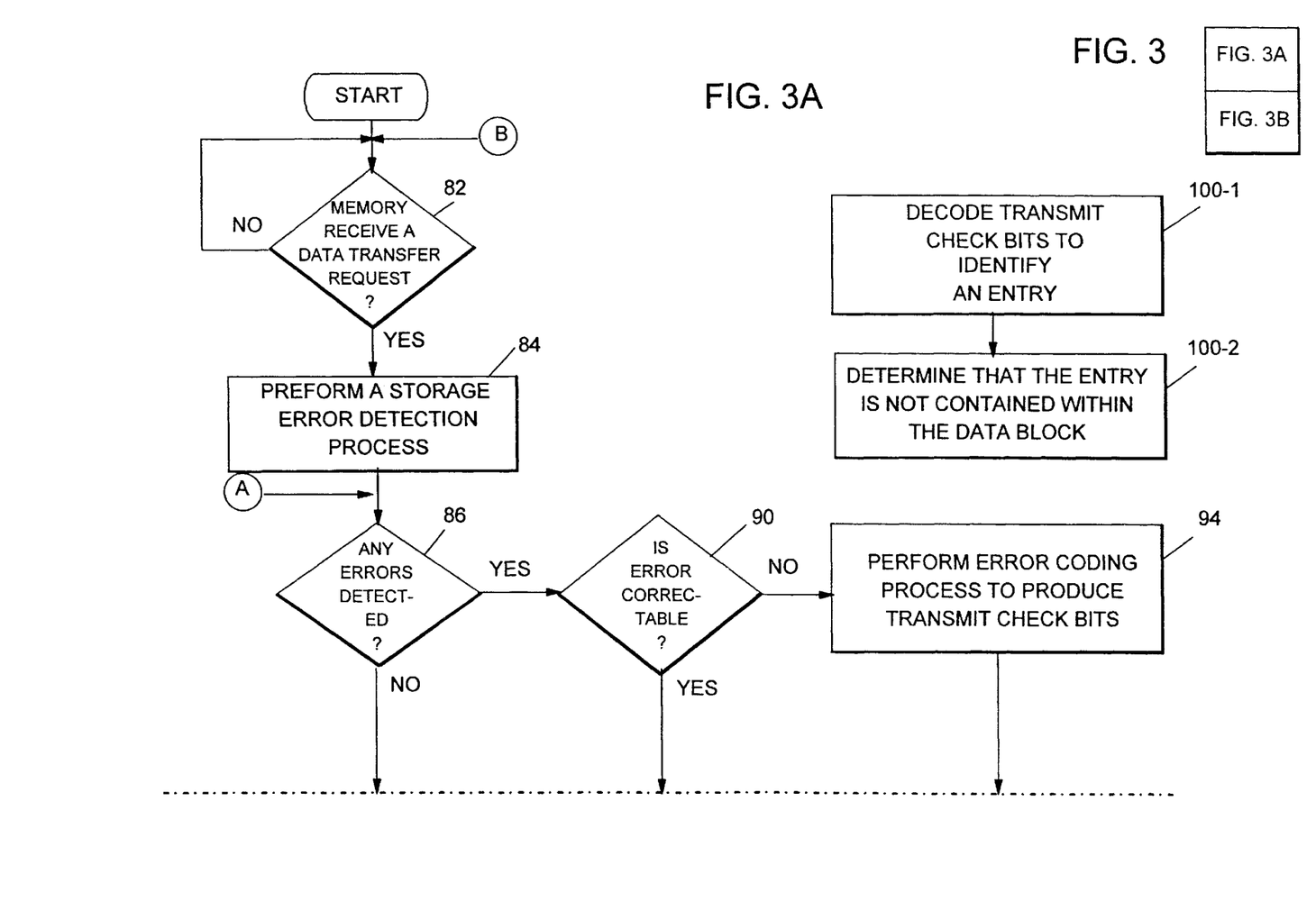

FIG. 3 (FIG. 3A and 3B) illustrates a logic diagram that may be used to implement the present invention. The process begins at step 82 wherein the memory unit determines whether it has received a data transfer request. When a data transfer request has been received, the process proceeds to step 84 wherein the memory unit performs a storage error detection process. The storage error detection process will be described further with reference to FIG. 5.

Figure 3B:
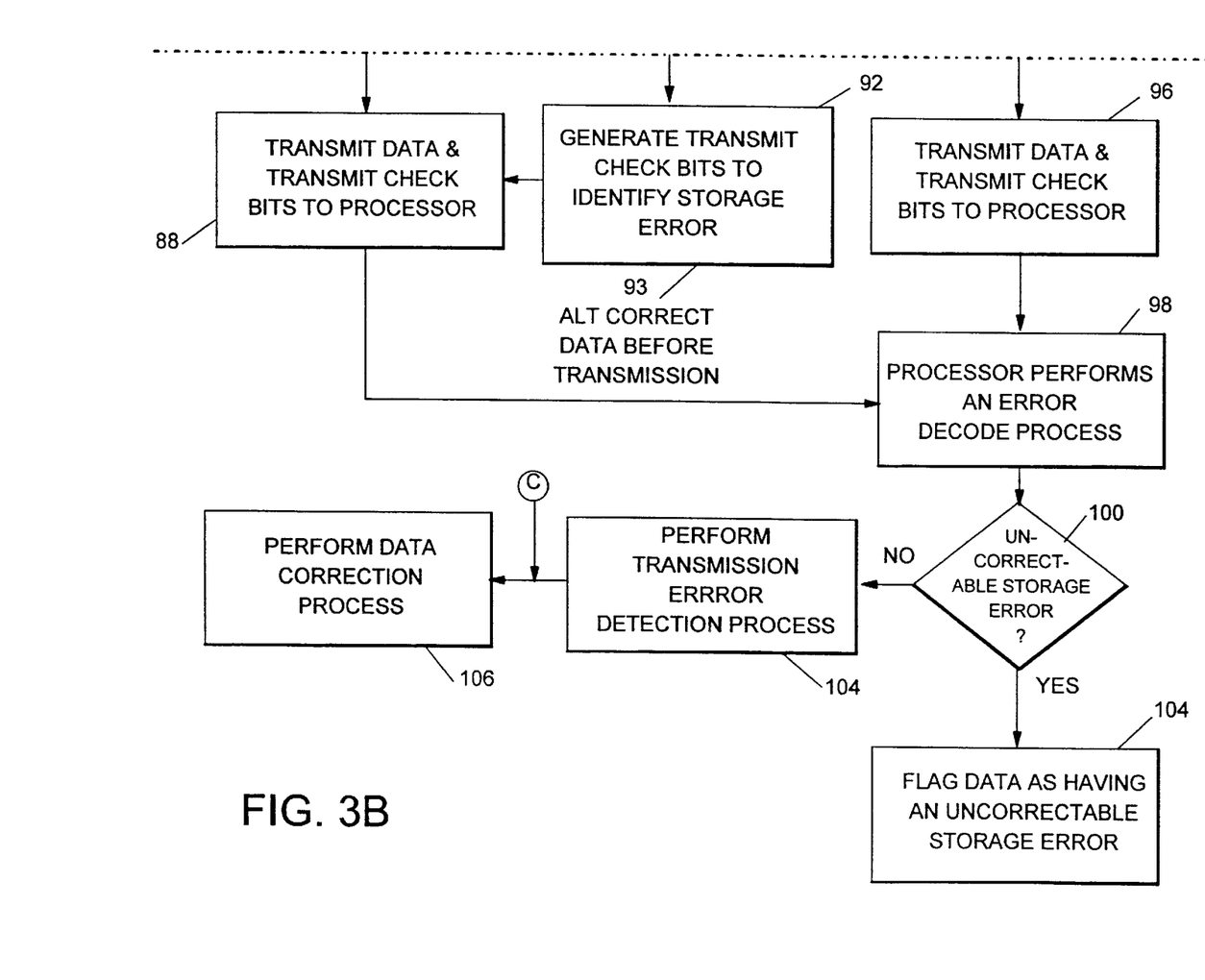

After performing the storage error detection process, the flow proceeds to step 86 where the memory unit determines whether any errors have been detected. When no errors have been detected, the flow proceeds to step 88 wherein data and transmit check bits are transmitted to the processor. If, however, errors are detected at step 86, the process proceeds to step 90 where the memory unit determines whether the error is correctable. If the error is not correctable, the process proceeds to step 94 wherein the memory unit performs an error coding process to produce transmit check bits wherein the transmit check bits indicate the uncorrectable error. After generating the transmit check bits that indicate the uncorrectable error, the data and transmit check bits are transmitted to the processor at step 96.

If, at step 90, the errors detected by the memory units are correctable, the process proceeds to step 92. At step 92, the memory unit generates transmit check bits to identify the particular entry of the data block that includes the error. As mentioned above, the number of bits that may be corrected are dependent on the error correction coding being used. Having generated the transmit check bits to identify the storage error, the process proceeds to step 88 wherein the uncorrected data and transmit check bits are transmitted to the processor.

As an alternative to generating transmit check bits to identify a storage error and sending uncorrected data, the memory unit may correct the error prior to transmission of the data to the processor. In this instance, the transmit error detection circuit, or the encoding circuit, would, based upon the indicated error, correct the data. Upon correcting the data, the memory unit would generate new transmit check bits based on the corrected data and transmit the newly generated transmit check bits along with the corrected data to the processing unit.

Upon receiving the data and transmit check bits, the processor, at step 98, performs an error decode process. After performing the error decode process, the processor determines, at step 100, whether the data includes an uncorrectable storage error. To determine whether the data includes an uncorrectable storage error, the processor, at step 100-1, decodes the transmit check bits to identify an entry. At step 100-2, the processor determines that the entry is not contained within the particular data block. Thus, having identified an entry not within the data block, the processor determines that the data includes the uncorrectable error. When the data has been identified to include the uncorrectable error, the process proceeds to step 102 wherein the processor is flagged that the data has an uncorrectable storage error such that the processor will not process the data. By not processing data containing an uncorrectable storage error, a system error will not result, thus avoiding rebooting of the computer system.

If the received data does not include an uncorrectable storage error, the process proceeds to step 104 wherein the processor performs a transmission error detection process. The transmission error detection process will be more fully described with reference to FIG. 6 below. After performing the transmission error detection process, the process proceeds to step 106 wherein the processor performs a data correction process. The data correction process will be described more fully with reference to FIG. 4.

Figure 4:
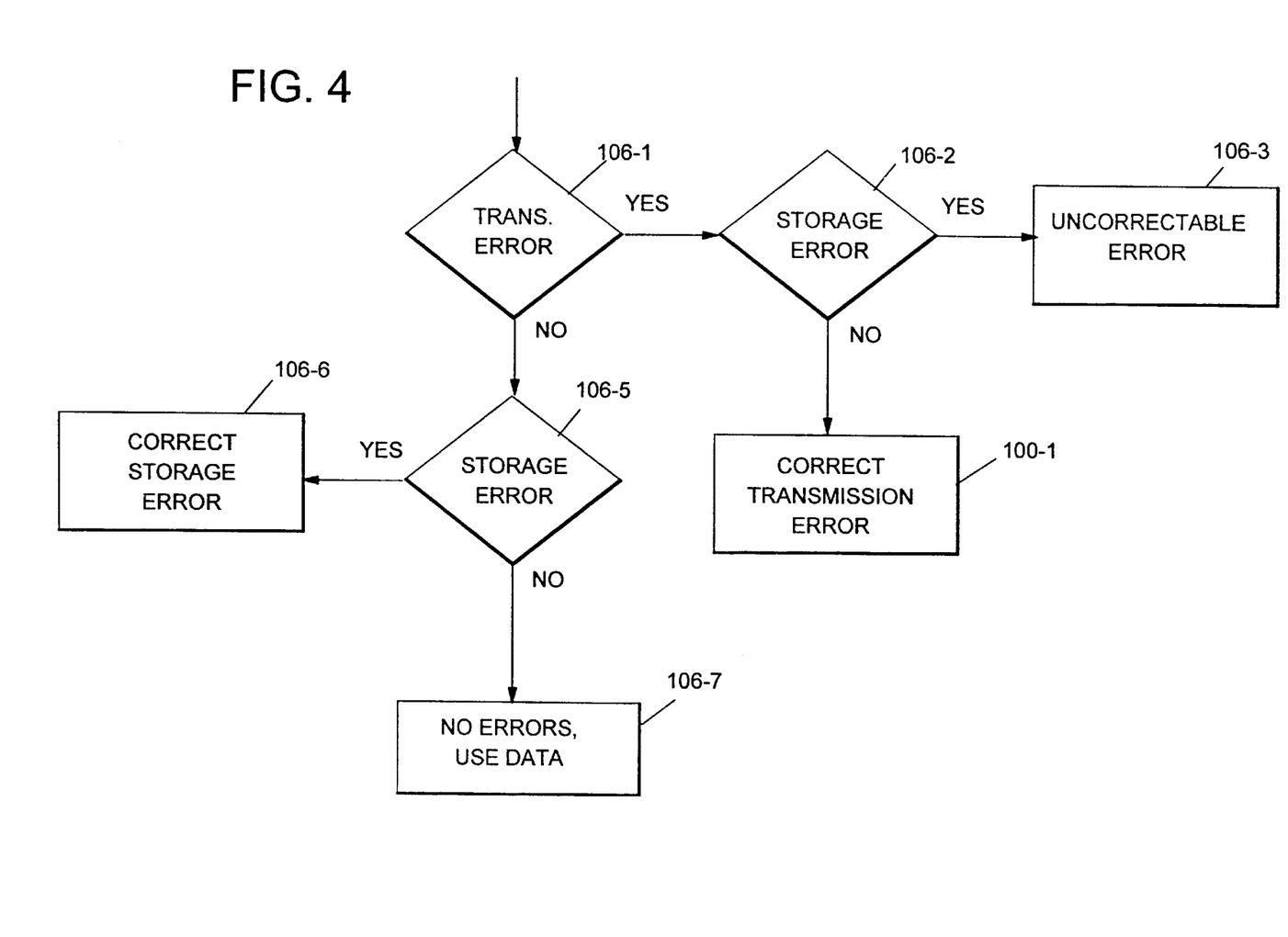
FIG. 4 illustrates a logic diagram which further describes the data correction process of FIG. 3.

FIG. 4 illustrates a logic diagram that may be used by the present invention to perform a data correction process. At step 106-1, the processor determines whether it has encountered any transmission errors. If a transmission error has been encountered, the process proceeds to step 106-2 where the processor determines whether it has also encountered a storage error. If both a storage error and a transmission error have been encountered, the process proceeds to step 106-3 where an uncorrectable error is flagged. If, however, the processor detected a transmission error but not a storage error, the process proceeds to step 106-4 wherein the transmission error is corrected. As mentioned above, an error is corrected by inverting the bit.

If no transmission errors have been encountered, the process proceeds to step 106-5 where it determines whether a storage error has been encountered. If no storage errors or transmission errors have been encountered, the process proceeds to step 106-7 where it is indicated that there are no errors and the data is usable as received. If, however, a storage error was encountered but a transmission error was not, the process proceeds to step 106-6 where the storage error is corrected. As previously discussed, a storage error is corrected by inverting the particular data bit.

Figure 5:
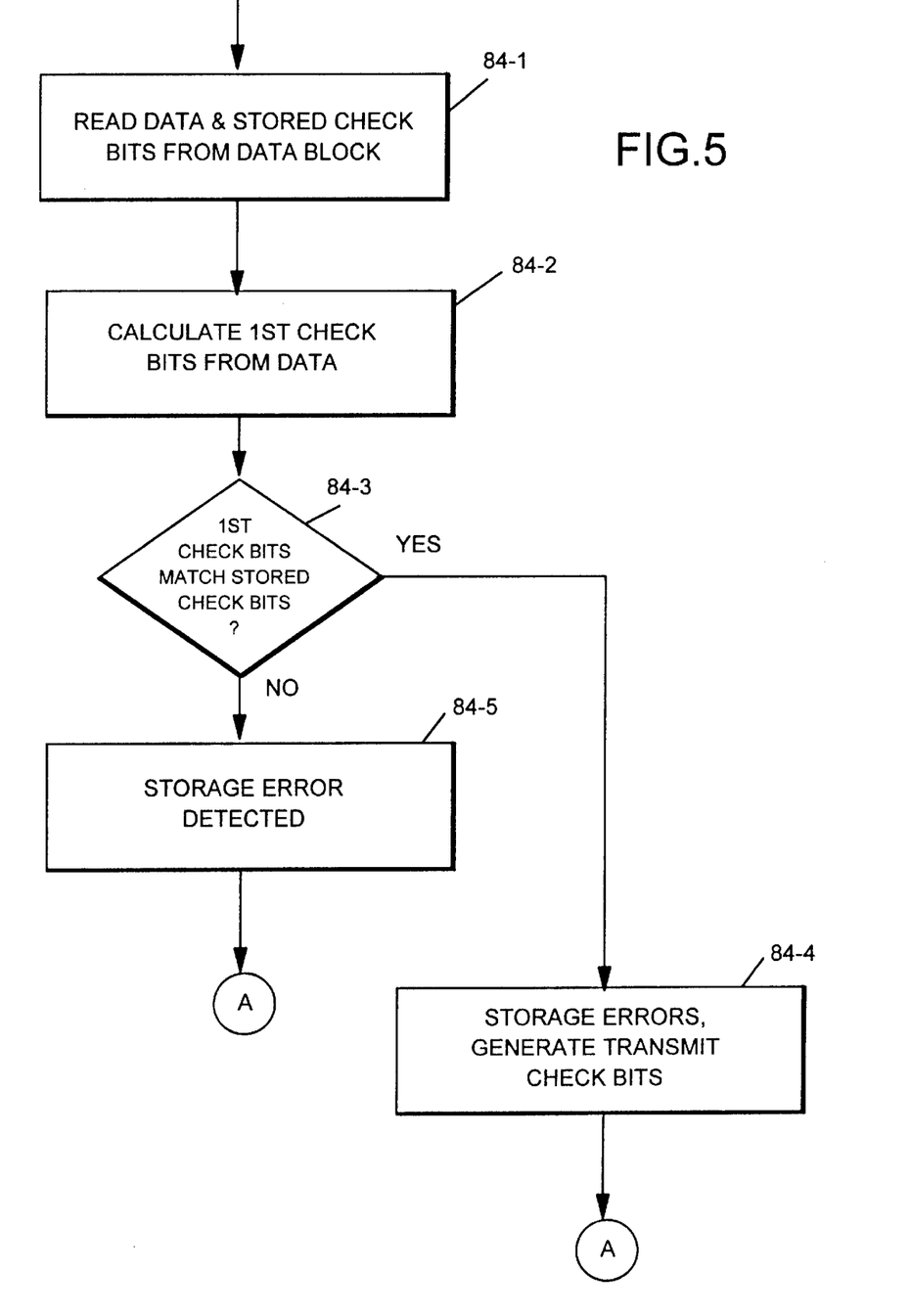
FIG. 5 illustrates a logic diagram which further describes the storage error detection process of FIG. 3.

FIG. 5 illustrates a logic diagram that may be used to implement the storage error detection process of step 84 of FIG. 3. The process begins at step 84-1 wherein data and storage check bits are read from a particular data block. The data block is the amount of data being read from the memory for a given data request. For example, the data block may be 32 bits of information. Next, the process proceeds to step 84-2 wherein the memory unit calculates the first check bits from the data. In essence, the memory unit is performing an identical function that was used to generate the stored check bits. Having generated the first check bits, the process proceeds to step 84-3 wherein the first check bits are compared with the stored check bits. When the stored check bits match the first check bits, the process proceeds to step 84-4 wherein no storage errors are detected, and the memory unit generates the transmit check bits based on the data. If, however, the first check bits do not match the stored check bits, the process proceeds to step 84-5 wherein a storage error is detected.

Figure 6:
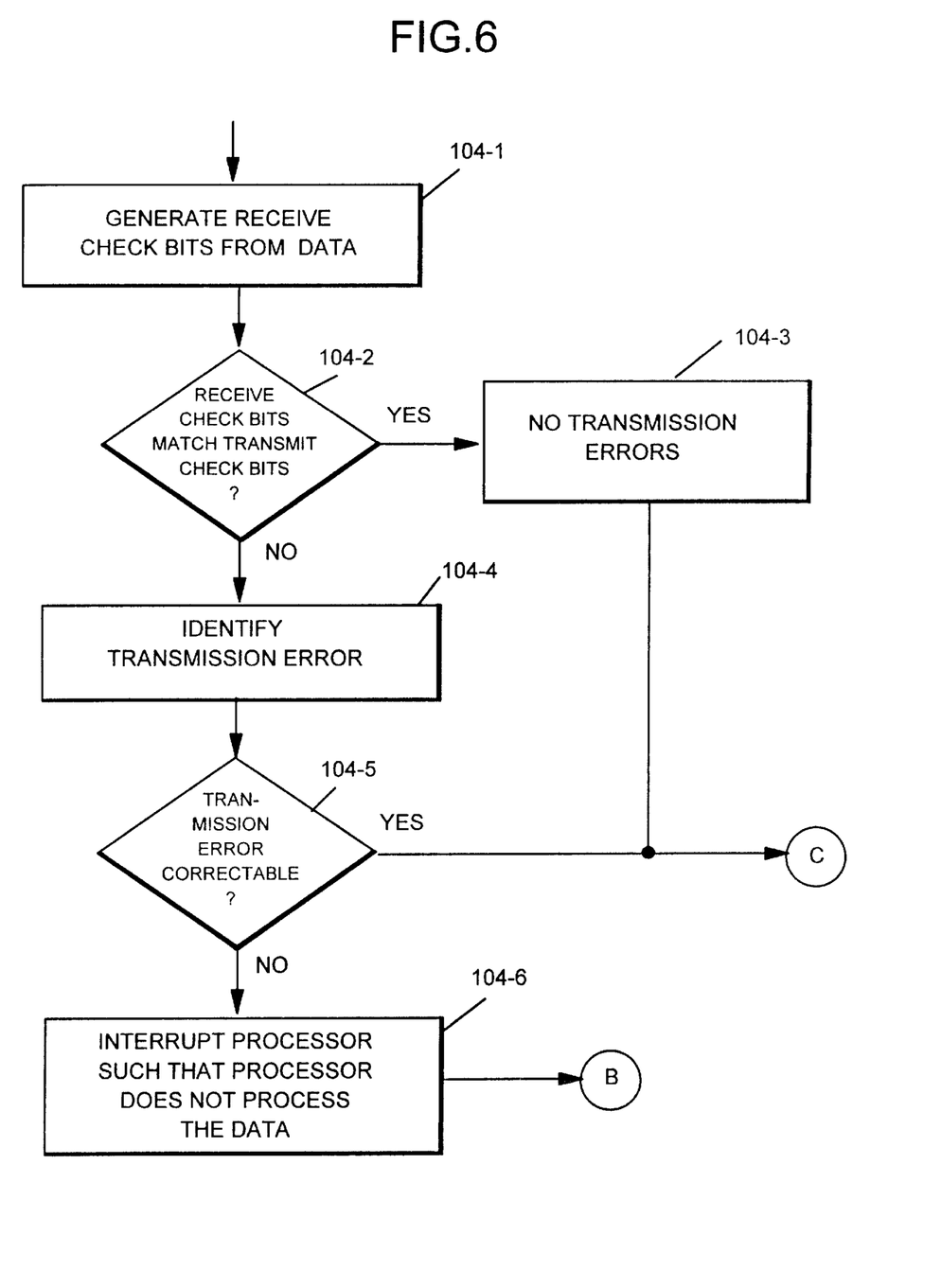
FIG. 6 illustrates a logic diagram which more fully describes the transmission error detection process of FIG. 3.

FIG. 6 illustrates a logic diagram which may be used to perform the transmission error detection process step 104 of FIG. 3. The process begins at step 104-1 wherein the processor generates received check bits from the data. Having generated the received check bits, the processor determines whether the received check bits match the transmitted check bits. If the received check bits match the transmit check bits at step 104-2, the process proceeds to step 104-3 wherein no transmission errors have been detected.

If, however, step 104-2 indicated that the received check bits do not match the transmit check bits, the process proceeds to step 104 wherein the transmission error is identified. Having identified the transmission error, the processor, at step 104-5, determines whether the transmission error is correctable. If correctable, the processor indicates the particular entry and the process proceeds to step 106 of FIG. 3. If, however, the transmission error is not correctable, the process proceeds to step 104 of FIG. 3 wherein the processor is interrupted such that it does not process the data containing the uncorrectable error.

The present invention provides a method and apparatus for identifying data that includes uncorrectable errors. By identifying data that includes uncorrectable errors and notifying a processor, the processor can avoid utilizing the data with the uncorrectable errors. By not utilizing such data, the processor avoids a system error and thus avoids having to reboot the system. In large computer systems, the rebooting process may take up to 24 hours. Thus, by avoiding the need to reboot due to uncorrectable errors in data, the present invention provides users with a mechanism for avoiding such dramatic interruptions of computer services.

What is claimed is:

1. A method for indicating to a processor that data having an uncorrectable error is to be received, the method comprising the steps of:

a) when a data transfer request is received by a memory unit, performing a storage error detection process on a data block of the memory unit, wherein the data transfer request identifies the data block;

b) when the storage error detection process indicates an uncorrectable error, performing an error coding process to produce transmit check bits which indicate that the data block includes the uncorrectable error;

c) routing the data and the transmit check bits from the memory unit to the processor; and d) when the data and the transmit check bits are received, performing an error decode process based on the transmit check bits to determine that the data includes the uncorrectable error, such that the data having the uncorrectable error is identified.

2. The method of claim 1, wherein the step of performing the storage error detection process further comprises the steps of:

reading data and stored check bits from the data block;
   calculating first check bits from the data;
   when the first check bits do not match the stored check bits, identifying a storage error in the data; and
   determining whether the storage error is correctable or uncorrectable.

3. The method of claim 2 further comprises:

when the first check bits match the stored check bits, performing the error coding process to produce the transmit check bits which indicate that the data does not include a storage error.

4. The method of claim 3, wherein the step of performing the error decode process further comprises the steps of:

generating receive check bits from the data;
   comparing the receive check bits with the transmit check bits;
   when the received check bits match the transmit check bits, utilizing the data.

5. The method of claim 3, wherein the step of performing the error decode process further comprises the steps of:

generating receive check bits from the data;
   comparing the receive check bits with the transmit check bits;
   when the receive check bits do not match the transmit check bits, identifying a transmission error; and
   determining whether the transmission error is correctable or uncorrectable.

6. The method of claim 5 further comprises the steps of:

when the transmission error is correctable, correcting the transmission error to produce corrected data; and
   utilizing the corrected data.

7. The method of claim 5 further comprises the step of:

when the transmission error is uncorrectable, interrupting the processor such that the processor does not process the data.

8. The method of claim 2 further comprises the steps of:

when the storage error is correctable, correcting the storage error to produce a corrected data; and
   performing the error encode process on the corrected data to produce the transmit check bits which indicate that the corrected data does not include the storage error.

9. The method of claim 8, wherein the step of performing the error decode process further comprises the steps of:

generating receive check bits from the corrected data;
   comparing the receive check bits with the transmit check bits; and
   when the receive check bits match the transmit check bits, utilizing the corrected data.

10. The method of claim 8, wherein the step of performing the error decode process further comprises the steps of:

generating receive check bits from the corrected data;
    comparing the receive check bits with the transmit check bits; and
    when the receive check bits do not match the transmit check bits, determining whether a transmission error is correctable or uncorrectable.

11. The method of claim 1, wherein the step of performing the storage error detection process further comprises the step of performing the storage error detection process using a first error correction process, and wherein the step of performing the error decode process further comprises the step of performing the error decode process using a second error correction process.

12. The method of claim 1, wherein the step of performing the error decode process further comprises the steps of:

generating receive check bits from the data;
    comparing the receive check bits with the uncorrectable check bits; and
    when the receive check bits do not match the uncorrectable check bits, determining that the data includes the uncorrectable error.

13. The method of claim 12, wherein the step of determining that the data includes the uncorrectable error further comprises the steps of:

decoding the transmit check bits to identify an entry; and
    determining that the entry is not contained within the data block.

14. The method of claim 1 further comprises the steps of:

when the storage error detection process indicates a correctable storage error, performing, by the memory unit, the error coding process to produce transmit check bits, wherein the transmit check bits indicate the storage error;
    transmit the data and the transmit check bits to the processor;
    performing, by the processor, the error decode process to determine the storage error; and
    correcting, by the processor, the storage error to produce corrected data.

15. A data processing system comprising:

memory unit that includes:
- data storage that stores data and stored check bits;
- storage error detection circuit operably coupled to receive the data and the stored check bits, wherein the storage error detection circuit, using a first error detection process, produces an uncorrectable error signal when an uncorrectable storage error is detected;
- check bit encoder operably coupled to the storage error detection circuit, wherein the check bit encoder produces transmit check bits when the uncorrectable error signal is received, wherein the transmit check bits indicate the uncorrectable storage error;

a processor operably coupled to the memory unit, wherein the processor includes:
- a processing core that processes data, wherein the processing core does not process the data when a data error signal is received; and
- transmit check bit decoder operably coupled to receive a representation of the transmit check bits and produces, in response thereto, the data error signal when the transmit check bits indicate that the data includes the uncorrectable storage error.

16. The data processing system of claim 15, wherein the check bit encoder further comprises means for generating the transmit check bits from the data to indicate that the data does not include the uncorrectable storage error.

17. The data processing system of claim 16, wherein the check bit encoder further comprises a multiplexor having inputs to receive the transmit check bits and inverted transmit check bits, wherein the multiplexor outputs, when the uncorrectable storage error exists, the inverted transmit check bits as the transmit check bits to indicate the uncorrectable storage error.

18. The data processing system of claim 15, wherein the processor further comprises a transmit error detection circuit operably coupled to receive the data, wherein the transmit error detection circuit determines whether the data contains a transmission error and generates the data error signal, when the transmission error is uncorrectable.

19. The data processing system of claim 18, wherein the processor further comprises a data correction circuit operably coupled to the transmit error detection circuit and the transmit check bit decoder, wherein the data correction circuit corrects the data when either the transmit error detection circuit or the transmit check bit decoder indicate a correctable error.

20. A memory unit comprising:
- data storage for storing data and stored check bits;
- storage error detection circuit operably coupled to the data storage, wherein the storage error detection circuit produces uncorrectable error signal when an uncorrectable storage error is detected within the data; and
- check bit encoder operably coupled to the storage error detection circuit, wherein the check bit encoder produces transmit check bits that indicate the uncorrectable storage error when the uncorrectable error signal is received.

21. A processor comprising:
- a processing core that processes data based upon operational codes, wherein the processing core does not process the data when a data error signal is received; and
- transmit check bit decoder operably coupled to receive transmit check bits and produces, in response thereto, the data error signal when the transmit check bits indicate that the data includes an uncorrectable error.

* * * * *